United States Patent
Chen et al.

(10) Patent No.: US 8,989,559 B2
(45) Date of Patent: *Mar. 24, 2015

(54) VIDEO IMPORTANCE RATING BASED ON COMPRESSED DOMAIN VIDEO FEATURES

(75) Inventors: George Chen, Coppell, TX (US); Mohamed Khames Ben Hadj Miled, Irving, TX (US); Asad Islam, Richardson, TX (US)

(73) Assignee: Core Wireless Licensing S.a.r.l., Luxembourg (LU)

(*) Notice: Subject to any disclaimer, the term of this patent is extended or adjusted under 35 U.S.C. 154(b) by 569 days.

This patent is subject to a terminal disclaimer.

(21) Appl. No.: 13/248,564

(22) Filed: Sep. 29, 2011

(65) Prior Publication Data

US 2012/0013793 A1    Jan. 19, 2012

Related U.S. Application Data

(63) Continuation of application No. 11/476,114, filed on Jun. 28, 2006, now Pat. No. 8,059,936.

(51) Int. Cl.
*H04N 9/80* (2006.01)
*G06K 9/00* (2006.01)
*G06T 7/20* (2006.01)
*H04N 19/48* (2014.01)

(52) U.S. Cl.
CPC ............ *H04N 19/48* (2013.01); *G06K 9/00711* (2013.01); *G06T 7/2013* (2013.01)
USPC ......................................... 386/248; 386/243

(58) Field of Classification Search
CPC ............ G06K 9/00711; G06T 7/2013; H04N 7/26329
USPC ............ 386/248, 343; 715/723, 719; 382/274
See application file for complete search history.

(56) References Cited

U.S. PATENT DOCUMENTS

| | | | | |
|---|---|---|---|---|
| 5,974,192 A | * | 10/1999 | Kundu | 382/260 |
| 6,141,486 A | | 10/2000 | Lane et al. | |
| 6,763,069 B1 | * | 7/2004 | Divakaran et al. | 375/240.08 |
| 7,899,208 B2 | * | 3/2011 | Kondo et al. | 382/103 |
| 8,059,936 B2 | * | 11/2011 | Chen et al. | 386/248 |
| 2005/0182503 A1 | | 8/2005 | Lin | |
| 2005/0254782 A1 | * | 11/2005 | Hsu | 386/52 |
| 2009/0232412 A1 | * | 9/2009 | Hutchinson et al. | 382/274 |

FOREIGN PATENT DOCUMENTS

| | | |
|---|---|---|
| EP | 0722252 | 7/1996 |
| WO | WO 2005/066897 A1 * | 7/2005 |

* cited by examiner

*Primary Examiner* — David Harvey
(74) *Attorney, Agent, or Firm* — Ziegler IP Law Group, LLC

(57) ABSTRACT

Systems and methods are provided for identifying important video frames and segments in multimedia content such as a segmented compressed domain video. Video frames in a segment are analyzed to determine intensity, contrast, and motion values for the frames and their segments. The values among frames and segments are compared to identify one or more video segments likely to be important to a viewer. The systems and methods may additionally be augmented with audio data other characteristics associated with the video frames and segments analyzed.

20 Claims, 5 Drawing Sheets

VIDEO IMPORTANCE RATING BASED ON COMPRESSED DOMAIN VIDEO FEATURES

RELATED APPLICATION

The present application is a continuation of co-pending U.S. patent application Ser. No. 11/476,114, filed Jun. 28, 2006, entitled "Video Importance Rating Based on Compressed Domain Video Features," which is hereby incorporated by reference in its entirety for all purposes.

BACKGROUND

The present disclosure relates to the identification of important video frames and segments. For certain multimedia content that is divisible into shorter video segments, it is often the case that some segments of the video are more important to potential viewers than others. Recorded television programs, news broadcasts, or video outputs from a security camera, to name just a few examples, may have certain segments particularly relevant to users. Thus, several prior attempts have been made to automatically identify video frames or segments that may be relevant to potential viewers.

In one prior method, a video sequence is divided into segments of different lengths. For example, a television broadcast may be divided into segments based so that each segment corresponds to a scene. Then, the video segments with longer lengths are assumed to be the most relevant ones. Thus, segment length is measured for all segments, and portions of the longest segments are selected and displayed to the user. However, the assumption underlying such methods, that longer video segments tend to contain important scenes or stories, often proves unreliable. Further, since these methods are not based on the content of the video, the selected video segments become little more than blind guesses when the segment length assumption breaks down.

In another prior method, an object-based approach is used to analyze the individual video frames to identify relevant shapes, for example, a human head in a news broadcast. When a relevant shape is found, the segment is determined to be more important than other segments without relevant shapes. Such methods, while based on the video content, may be computationally expensive to implement. They may require first uncompressing the data, then executing expensive algorithms to identify the relevant shapes. Such object-based approaches are therefore unavailable to many systems with less processing power, such as mobile terminals.

Accordingly, there remains a need for methods and systems of identifying relevant segments in video and multimedia content, such as compressed domain video streams.

SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

According to one aspect of the present disclosure, important video frames and segments from compressed domain video data may be identified and presented to a user. Video segments may be partitioned into video frames and smaller units, such as macroblocks, and then analyzed for key perceptual features such as intensity, contrast, and motion. Based on these key features, the individual macroblocks may be assigned an importance rating. Aggregating the values from macroblocks, importance ratings for video frames and longer video segments may be calculated. These importance ratings may correspond to the likely relevance of the video segment to a potential viewer, and may be used to determine a set of video segments to display to the viewer.

According to another aspect of the present disclosure, the importance ratings of video frames and segments may be augmented with audio information associated with the video. Thus, an audio segmentation corresponding to the same video segments may be classified into different audio classes (e.g., speech, silence, noise) and the importance rating of associated video segments may be adjusted based on the audio class.

According to yet another aspect of the present disclosure, intra frames (I-frames) may be distinguished from predictive frames (P-frames) in order to determine a motion value for a video frame or segment. P-frames may be encoded with reference to previous frames in the sequence, and thus a motion vector may be determined from the P-frame data. In some circumstances, this motion vector may increase the importance rating of a video segment. However, certain types of motion (e.g., fast motion) in a video frame or segment may indicate that the segment may be less relevant to a viewer, and thus the importance rating for a segment will decrease when certain motion vectors are calculated.

BRIEF DESCRIPTION OF THE DRAWINGS

Figure 1:
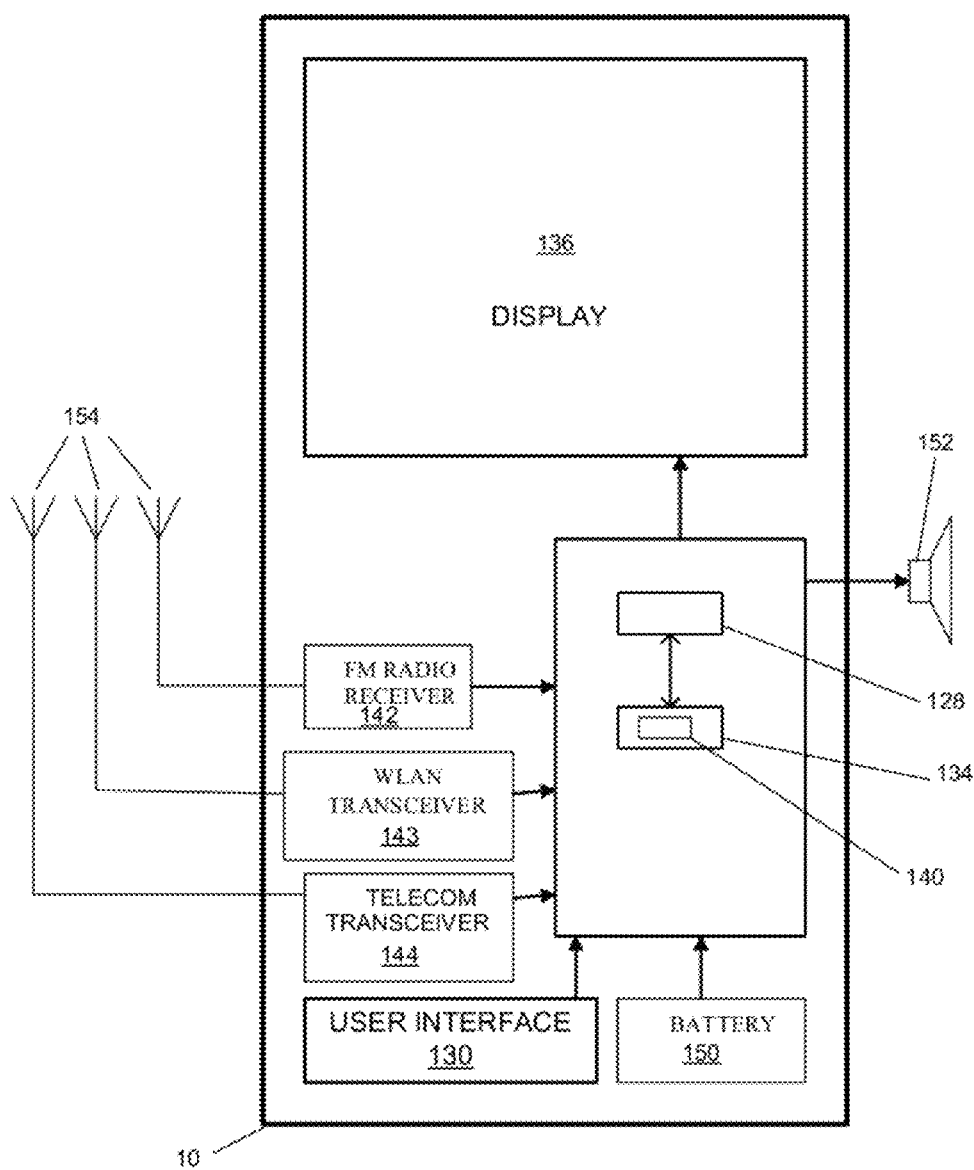
Figure 2:
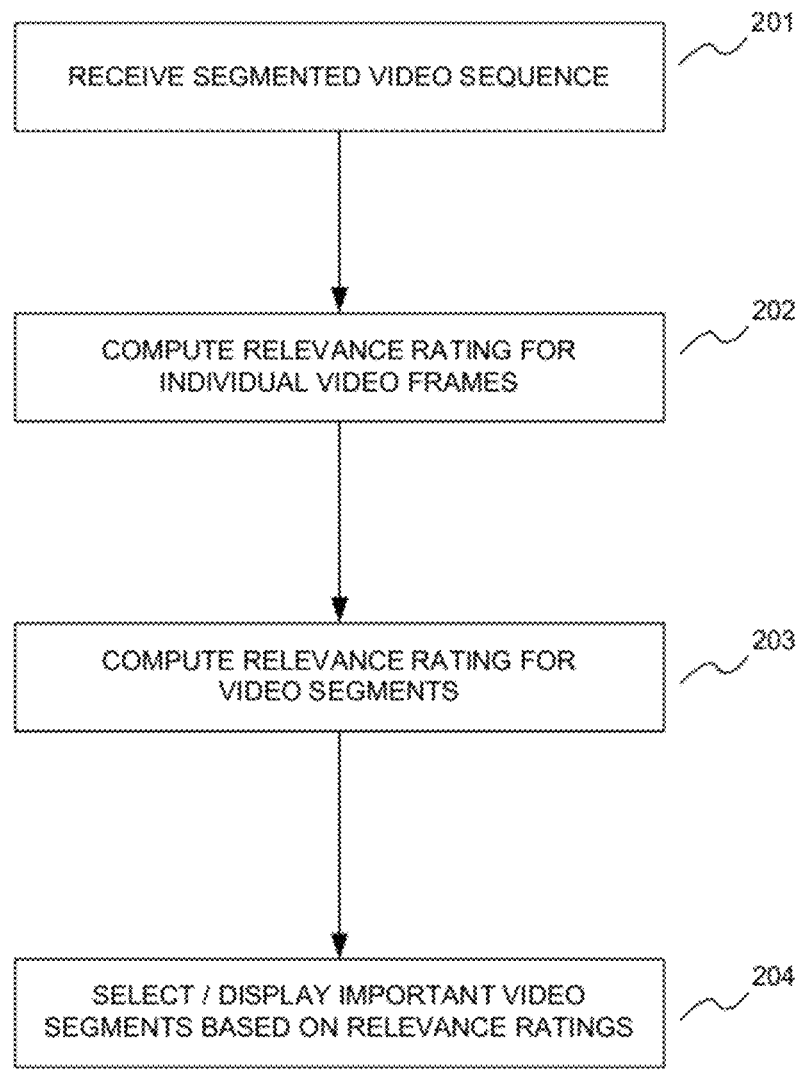
Figure 3:
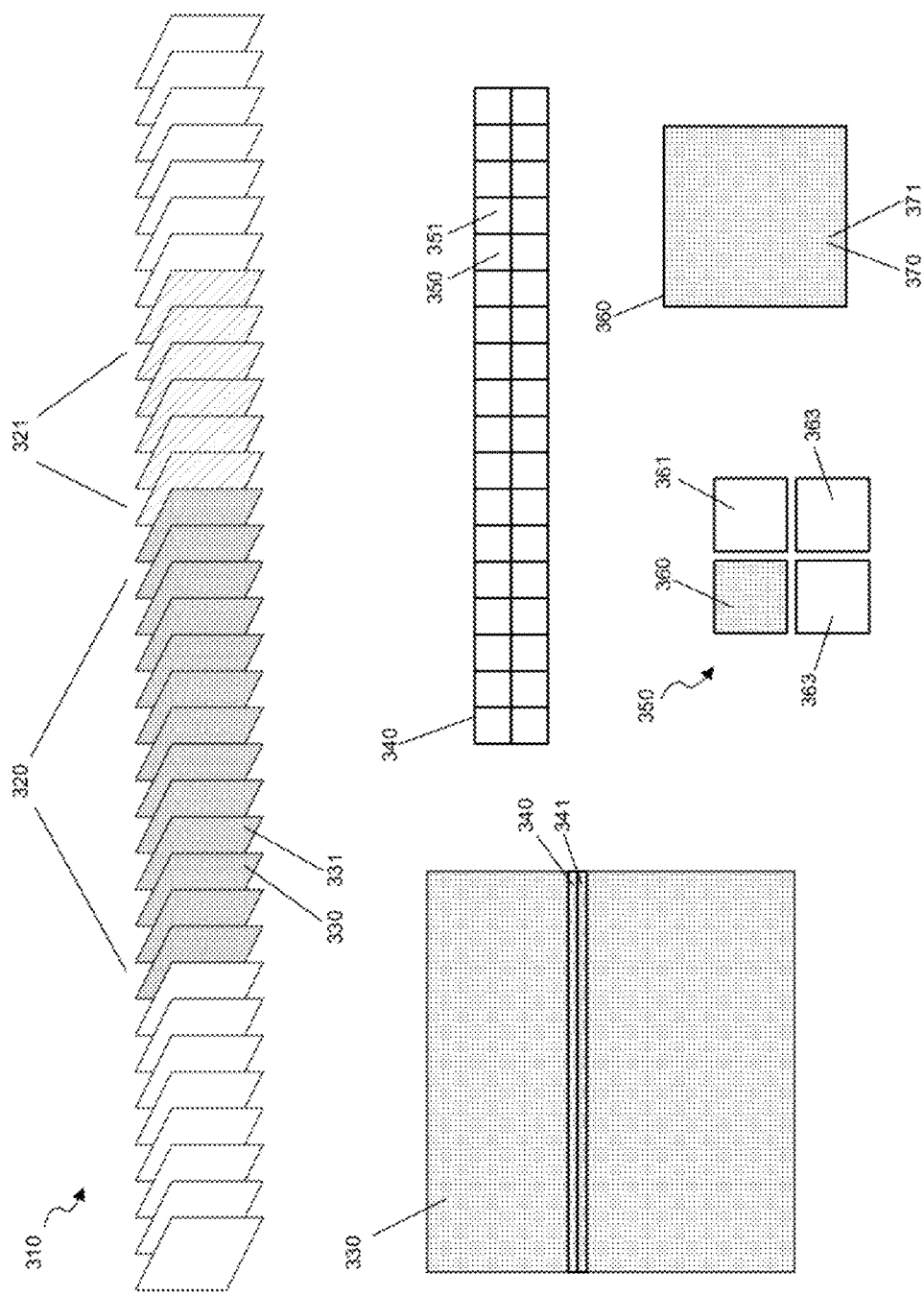
Figure 4:
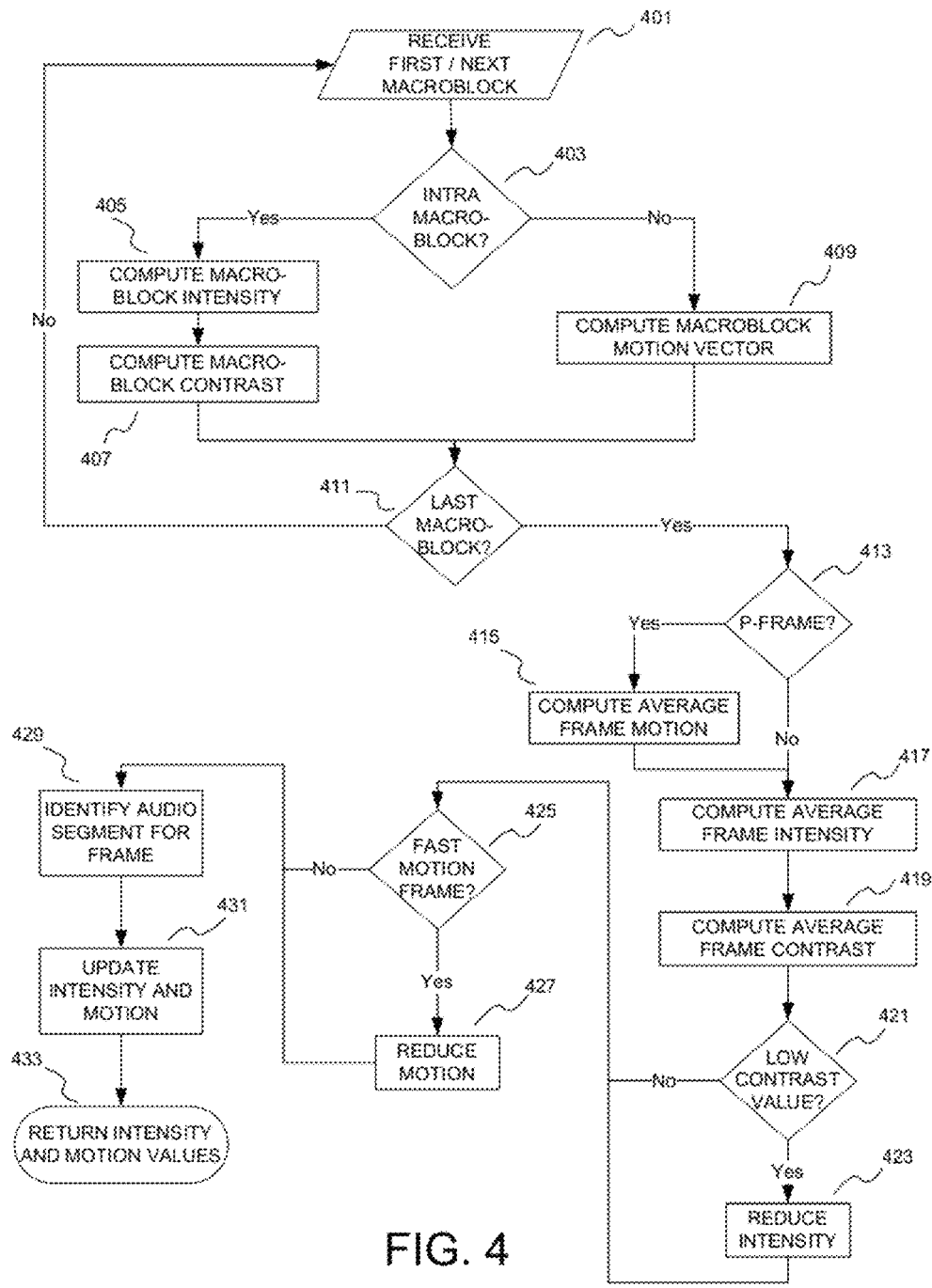
Figure 5:
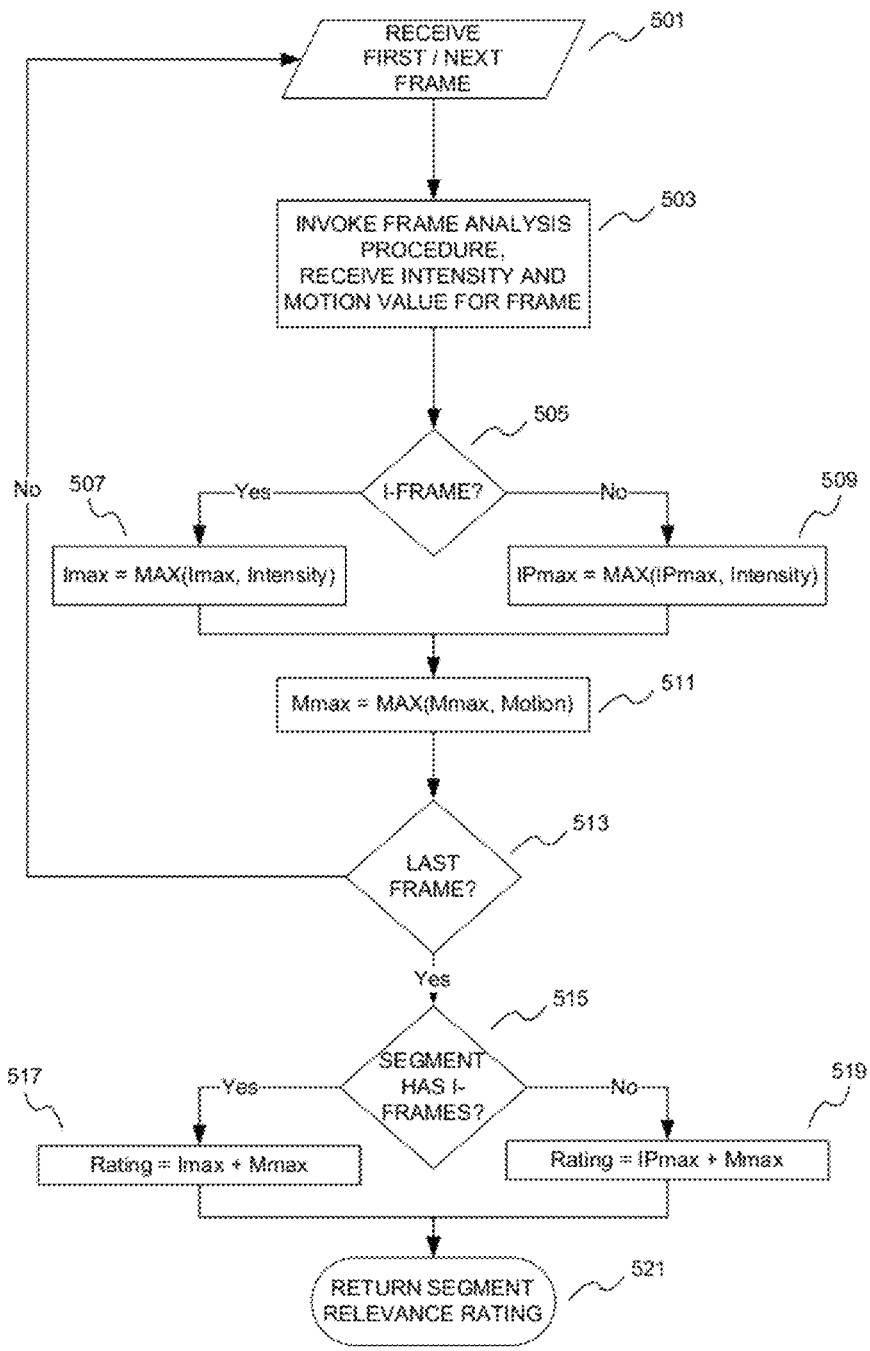

Having thus described the invention in general terms, reference will now be made to the accompanying drawings, which are not necessarily drawn to scale, and wherein:

FIG. 1 illustrates a block diagram of a mobile terminal, in accordance with aspects of the present disclosure;

FIG. 2 is a flowchart showing illustrative steps for identifying a relevant video segment, in accordance with aspects of the present disclosure;

FIG. 3 illustrates a block diagram of a segmented video sequence divided into smaller components, in accordance with aspects of the present disclosure;

FIG. 4 is a flowchart showing illustrative steps for analyzing a video frame, in accordance with aspects of the present disclosure; and FIG. 5 is a flowchart showing illustrative steps for analyzing a video segment, in accordance with aspects of the present disclosure.

DETAILED DESCRIPTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope and spirit of the present invention.

Referring to FIG. 1, a block diagram of a mobile terminal 10 is shown on which aspects of the present disclosure may be implemented. As shown in FIG. 1, mobile terminal 10 may include processor 128 connected to user interface 130, memory 134 and/or other storage, and display 136. Mobile device 10 may also include battery 150, speaker 152, and antennas 154. User interface 130 may further include a keypad, touch screen, voice interface, one or more arrow keys, joy-stick, data glove, mouse, roller ball, touch screen, or the like.

Computer executable instructions and data used by processor 128 and other components within mobile terminal 10 may be stored in a computer readable memory 134. The memory 134 may be implemented with any combination of read only memory modules or random access memory modules, optionally including both volatile and nonvolatile memory and optionally being detachable. Software 140 may be stored within memory 134 and/or storage to provide instructions to processor 128 for enabling mobile terminal 10 to perform various functions. Alternatively, some or all of mobile terminal 10 computer executable instructions may be embodied in hardware or firmware (not shown).

Additionally, mobile device 10 may also be configured to receive, decode and process transmissions through FM/AM radio receiver 142, wireless local area network (WLAN) transceiver 143, and telecommunications transceiver 144. In one aspect of the invention, mobile terminal 10 may receive radio data stream (RDS) messages. Mobile terminal 10 may be equipped with other receivers/transceivers, e.g., one or more of a Digital Audio Broadcasting (DAB) receiver, a Digital Radio Mondiale (DRM) receiver, a Forward Link Only (FLO) receiver, a Digital Multimedia Broadcasting (DMB) receiver, etc. Hardware may be combined to provide a single receiver that receives and interprets multiple formats and transmission standards, as desired. That is, each receiver in a mobile terminal device may share parts or subassemblies with one or more other receivers in the mobile terminal device, or each receiver may be an independent subassembly.

It is to be understood that the mobile terminal 10 is only one example of a suitable environment and is not intended to suggest any limitation as to the scope of use or functionality of the present disclosure. Methods to identify and display important video segments may be implemented in other computing environments, such as desktop and laptop computers, and in multimedia player devices such as televisions, digital video recorders, DVD players, and the like.

Referring to FIG. 2, a flow diagram is shown describing a method for identifying a relevant video segment. The method of FIG. 2 may be performed, for example, at the mobile terminal 10. In step 201, mobile terminal 10 receives a segmented video sequence. This segmented video sequence may be for example, a previously-recorded television broadcast, a home video, recorded footage from a security camera, or any other multimedia content. Given the high data rates of television programming and other multimedia content, the segmented video sequence may be in a compressed format. For example, multimedia may be compressed domain data transformed using a discrete cosine transform (DCT), then further compressed with motion compensation, a form of differential encoding.

According to certain aspects, the video sequence may be segmented such that each segment contains one scene whose frames have similar visual characteristics. For example, if the video sequence were a television news broadcast, a new segment might begin each time the camera angle changes, or each time the broadcast cuts to a different scene in the studio or to a different remote location. Conventional techniques may allow for such segmentation of multimedia content, but such techniques fail to identify the segments likely to be most relevant to a potential human viewer.

In step 202, the mobile terminal 10 may extract video frames from the segmented video sequence, then may compute and assign a "frame relevance rating" to each video frame. Various aspects relating to determining frame relevance ratings are discussed in detail in reference to FIGS. 3-4. Every video frame in the sequence may potentially be extracted and analyzed, or alternatively a subset or sample of frames may be used to enhance the efficiency and/or accuracy of the methods. Similarly, each frame may potentially be assigned a frame relevance rating, or alternatively a subset of frames may be rated in the different segments while redundant or irrelevant frames are skipped.

In step 203, the mobile terminal 10 may aggregate the importance ratings computed in step 202 for each video segment to produce a "segment relevance rating." For example, the frame relevance ratings may be summed, averaged, or analyzed for various metrics before being combined to create the overall segment relevance rating, which may then be compared to the relevance rating of other segments in the sequence. Various aspects for determining segment relevance ratings are discussed in detail in reference to FIG. 5.

In step 204, mobile terminal 10 may compare the segment relevance ratings to determine one or more video segments that a potential viewer might find interesting or important. These most relevant video segments may then be used by the terminal 10, for example, in cleaning the video sequence, or creating a summary or preview of the video for the user.

Referring to FIG. 3, a block diagram is shown of a segmented video sequence 310 divided into smaller data components. A segmented video sequence, such as compressed domain multimedia content, may include several video segments and a large number of pictures, or video frames. For example, a video sequence 310 may be a Motion Pictures Expert Group (MPEG) formatted file, storing a television program, divided into different video segments 320, 321 which are based on the different scenes in the television program. Full-motion video might typically require approximately 30 frames per second. Thus, in this example, a video segment 320 that is 15 seconds long may contain 450 different video frames. Certain video sequences may be segmented solely accordingly to length, for example, video recorded by a security camera continuously recording one location, so that each video segment contains the same number of frames and requires the same amount of storage space. Other video sequences, such as, for example, a television program, may have different segments that differ in length and number of frames. As stated above, aspects of the present disclosure may be used to determine important video segments without respect to the length of the video segment. That is, segment relevance might not be at all related to segment length.

Video segment 320 includes frames 330 and 331. Video frames are essentially an image captured at some instant in time, and may be store as one of several different types. For example, an intra frame (I-frame) is coded without reference to any picture except itself. In contrast, a predicted frame (P-frame) may refer to previous frames in the decoding order. Unlike I-frames, P-frames may contain both image data and motion vector displacements, or combinations of the two.

A single video frame 330 may contain slices 340, 341, which are divided into macroblocks 350, 351. A slice is a portion of a frame, for example, a 16 pixel-wide cross-section of the frame 330. A macroblock 350 is a portion of a frame, typically a 16×16 elements (e.g., pixels or pels), which contains four 8×8 element blocks 360-363. Thus, in this example, each block 360 contains 64 elements 370, 371 (e.g., pixels or pels).

Referring to FIG. 4, a flow diagram is shown describing a method for analyzing a video frame 330. As described above, a video frame may be encoded as a group of smaller data components, such as macroblocks 350, 351. Like frames 330, 331, macroblocks 350, 351 may have different prediction types, for example, intra macroblocks and predicted macroblocks. In some cases, a single frame 330 may include different types of macroblocks 350, 351. For example, I-frames typically only contain intra macroblocks, while P-frames may contain both intra macroblocks and predicted macroblocks. In FIG. 4, a single frame 330 is analyzed one macroblock 350 at a time, using a looping function performed in a procedure by the mobile terminal 10. However, the invention is not limited to analyzing macroblocks, and one of skill in the art will recognize that other subdivisions or no subdivisions could instead be used.

In step 401, the first (or next) macroblock 350 is received for processing by the mobile terminal 10 or the other computational device performing the frame analyzing task in FIG. 4. For example, the processor 128 of the mobile terminal 10 may read in the data values for the next macroblock 350 into memory 134. The macroblock 350 may be 16×16 elements (e.g., pixels or pels), consisting of four 8×8 element blocks 360-363. In step 403, the macroblock 350 is identified as either an intra macroblock or a macroblock of another predictive type (e.g., a predictive macroblock or bi-predictive macroblock).

If the current macroblock 350 is an intra macroblock (403: Yes), then an intensity value for the macroblock is determined in step 405. For example, the intensity of each block 360-363 in macroblock 350 may be analyzed, and the intensities of the four blocks may be averaged to determine an intensity value for the macroblock 350. In certain aspects relating to compressed domain video, each block 360-363 may be transformed using an orthogonal transform, such as, for example, a discrete cosine transform (DCT), that transforms the macroblock coefficients into corresponding DCT coefficients. The first DCT coefficient, the DC component, gives a measure of the average intensity of the coefficients in the macroblock. This bitstream component can be used as a measure of the intensity or brightness in the macroblock. The de-quantized DC component represents the average intensity of the elements in the block. In step 405, the determined macroblock intensity value may be stored in the memory 134 of mobile terminal 10.

In step 407, a contrast value for the macroblock 350 is computed based on the blocks 360-363. Similar formulas are available for contrast calculation of blocks, yielding a macroblock contrast value, which may also be stored in the memory 134 of the mobile terminal 10 for each macroblock examined. Such contrast formulas may resemble the intensity formulas and similar techniques. The contrast calculations may also directly use the intensity value computed for the macroblock 350. For example, a 16×16 macroblock may be divided into four 8×8 blocks. Let the DC components of these four blocks be C1, C2, C3, C4, clockwise. The contrast may be calculated as |C1−C3|+|C2−C4|.

If the current macroblock 350 is not an intra macroblock (403:No), then a motion vector may be calculated for the macroblock 350 in step 409, rather than calculating intensity and contrast values. For example, a motion vector length may be determined by decoding the prediction mode and the motion vectors of the blocks 360-363. As with the intensity and contrast values for non-intra macroblocks, the motion values for intra macroblocks may be stored in the memory 134 of the mobile terminal 10 before examining the next macroblock. In step 411, if the most recently analyzed macroblock 350 is not the last macroblock in the video frame 330 (411:No), then control returns to step 401 where the next macroblock 350 may be read in and analyzed by mobile terminal 10.

Once all the macroblocks 350 have been analyzed (411: Yes), intensity, contrast, and motion values may be aggregated for the frame 330. One example of such an aggregation is shown in steps 413-33. In step 413, the predictive type of the frame 330 is identified. If frame 330 is a P-frame (413: Yes), then in step 415 the average motion value for the frame 330 is computed. This computation may be a simple arithmetical average of all non-intra macroblocks, or may involve a more complex calculation. Besides averaging macroblock motion vectors, other sophisticated methods can be applied, such as removing outlier motion vectors that are very different from most of the motion vectors, because the outlier motion vectors could be due to noise and may be considered in error. Considering only the "good" and reliable motion vectors for averaging may improve the predictability of the true motion of the frame.

In step 417, for both P-frames and I-frames, the average intensity is computed for the frame 330, based on the intensity values determined above for the intra macroblocks 350 in the frame 330. Similarly, in step 419, the average contrast is computed for the frame 330, regardless of predictive type, based on the contrast values for the intra macroblocks 350 in the frame 330.

Generally, it may be desirable to compute a frame relevance rating proportional to each of the intensity, the contrast, and the motion magnitude of the frame 330. However, under certain special circumstances, the actual likely importance of a particular frame to a human viewer may be inversely proportionate to one or more of these values. For example, in step 421, it may be determined that a frame 330 having a small contrast value (e.g., a very bright or very dark video frame) should have its intensity value reduced in step 423. For example, the intensity value for the frame may be reduced by a fixed amount in step 423, based on the low average contrast of the frames in the segment, in order to better predict the likely relevance of the segment to a potential viewer. Additionally, in step 425, when a frame 330 is determined to be a fast motion frame, the motion value may be reduced in step 427, thereby potentially reducing the frame relevance rating as an unwanted frame to a viewer. The rationale for such an adjustment may be, for example, that while motion in the video may indicate an event that might be relevant to a viewer, fast motion may be too quick to be perceived or understood by a human viewer, and therefore may indicate a video segment 320 which is less relevant. These and other adjustments may be made to the computed intensity, contrast, and motion magnitude values based on determinations of likely relevance to viewers.

In step 429, an audio segment may be identified for the current frame 330. According to certain aspects, audio segmentation may be available for the segmented video sequence 310. Note that the audio segmentation may be performed separately from the previously-discussed video segmentation. In fact, the audio segment need not match up temporally with the current video segment 320, as long as some portion of the audio segment may be accurately associated with the current frame 330. In step 429, an audio factor may be calculated based on the class of the audio segment associated with the current video frame 330. For example, an audio segment determined to be a speech segment which corresponds to video frame 330 may result in an audio factor that increases the overall relevance rating of frame 330. In contrast, an audio segment having only silence or noise may result in an audio factor for frame 330 that reduces the relevance rating of the frame 330. In step 431, the intensity, contrast, and/or motion magnitude values are updated, if needed, based on the audio factor determined in step 429. Audio data may be used to refine the ratings based on motion, etc. For example, a fast audio track may be determined more likely to accompany a fast or high motion frame, and vice versa. In one specific example, speech, slice and noise audio frame data is assigned a score of 0.75, 0.5 and 0.25 respectively, and then audio and video scores may be combined by multiplication.

In step 433, frame 330 has been analyzed and the all relevance rating values for the frame 330 have been computed. One or more of these values may then be communicated, for example, to a different procedure running on mobile terminal 10, so that these values can be compared against the corresponding values for other video frames. In this example, the intensity value and motion magnitude value for frame 330 are returned to a calling function. According to aspects of the present disclosure, certain values might not be returned to the calling function directly, but instead used to augment the other returned values, or might be ignored altogether depending on the specific values computed. In this example, an average contrast value was computed in step 419 but was not returned to the parent procedure in step 433, because in step 423 the intensity value might have been modified based on the contrast value. Similarly, although the identified audio factor is not returned to the parent procedure, that value is used in this example to augment both the intensity and the motion magnitude values. In fact, it may be possible to return a single value representing the relevance rating for each frame 330, which incorporates the intensity, contrast, motion, and audio of the frame. Still other factors, such as segment length or other content-based or context-based determinations may also affect the frame relevance value(s) returned in step 433.

Referring to FIG. 5, a flow diagram is shown describing a method for analyzing a video segment 320. In this example, the mobile terminal 10 executes the method, and invokes a subroutine to analyze the individual frames in step 501. The subroutine called in step 501 may be, for example, the procedure described in reference to FIG. 4, which returns an intensity value and a motion magnitude value for each frame 330 analyzed. In step 503, the mobile terminal 10 receives and stores the intensity and motion values for the frame 330 in memory 134.

At step 505, the predictive type of frame analyzed in steps 501-503 is identified, for example, as a P-frame or an I-frame. If the current values from step 503 (i.e., the return values for the most recently analyzed frame 350) correspond to an I-frame (505:Yes), then, in step 507, the intensity value for the current frame 330 is compared to the maximum I-frame intensity value, Imax, for any I-frame 330 analyzed up to that point in the video segment 320. Thus, if the intensity value received in the most recently executed step 503 is larger than the current Imax, then Imax will be replaced with the current intensity value in step 507. Otherwise, the Imax value will remain the same, and the current intensity value may be discarded.

If the most recently analyzed frame 330 is a P-frame (505:No), then, in step 509, a similar calculation is used to maintain an IPmax value, which stores the largest intensity value returned up to that point which corresponds to a P-frame. Thus, once every frame 330 in the video segment 320 has been analyzed, the Imax value will store the largest intensity value returned for any I-frame 330 in the segment 320, and the IPmax value will store the largest intensity value returned for any P-frame 330 in the segment 320.

In step 511, a Mmax value is maintained as the largest motion magnitude value returned by any frame 330 in the video segment 320. Unlike the maximum intensity values in the above example, the Mmax value need not depend on the predictive type of the frames, but may represent the largest motion value returned for any frame 330 in the segment 320.

At step 513, if there are video frames 330 in the video segment 320 that have not yet been analyzed (513:No), control will be looped back up to step 501 to analyze the remaining frames, one at a time, by invoking the frame analysis procedure in step 501 and receiving the intensity and motion values in step 503 for each remaining frame 330.

Once every frame 330 in the video segment 320 has been analyzed (513:Yes), the Imax, IPmax, and Mmax values should accurately represent the respective maximum values for the entire video segment 320. A video segment relevance rating may then be calculated based on these values.

In step 515, if the video segment 320 includes any I-frames (515:Yes), then the segment relevance formula will use the Imax value to compute the segment relevance rating in step 517 for video segment 320. Thus, in this example, even though the segment 320 may have many more P-frames than I-frames, only the maximum intensity value from an I-frame is used in the computation. It is to be understood, however, that the present disclosure is not limited to such embodiments. As stated above, the relevance rating ultimately returned for a video segment 320 may be based on both I-frame data and P-frame data, and may include intensity, contrast, motion, audio content, video content, segment length, and other factors associated with the multimedia content. The examples described in reference to FIGS. 4-5 simply illustrate certain aspects of the present disclosure.

Returning to step 517, in this example, if the video segment 320 contains I-frames, then the relevance rating for the segment 320 may be determined by the equation:

$$\text{Rating} = \text{Imax} * \alpha + \text{Mmax} * \beta$$

In one example, $\alpha$ may be assigned a value of 0.5, and $\beta$ may be assigned a value of 0.25. However, the coefficients $\alpha$ and $\beta$ may be customized to appropriately weight the intensity and motion values, as well as the contrast values, audio factors, etc., to produce the relevance rating that most closely tracks the likely relevance of the video segment 320 to a potential viewer, so that the importance of the video segment 320 may be compared relatively to the importance of other segments in the segmented video sequence 310, or so the overall relevance/important of the entire sequence (e.g., television broadcast, security video) may be measured.

If the video segment contains no I-frames (515:No), then the relevance rating for video segment 320 may be determined in step 519 by the equation:

$$\text{Rating} = \text{IPmax} * \alpha + \text{Mmax} * \beta$$

The coefficients $\alpha$ and $\beta$ used in step 519 may be the same set of coefficients used in the alternative equation of step 517, or alternatively a different set of coefficients may be used to weight the IPmax value relatively differently than the Imax value.

In step 521, the relevance rating for video segment 320 is returned. This value may, for example, be returned to yet another parent procedure executing on mobile terminal 10, for comparing the relevance ratings among all the video segments 320 in the segmented video sequence 310. This top-level parent procedure may then select video segments to display to the user, based at least in part on the relevance ratings of the segments 320. For example, the top-level procedure may create a television program summary to display the top five most important scenes (i.e., the five video segments 320 in the sequence 310 with the highest relevance ratings). The top-level procedure may further filter the video segments 320 based on segment length or the proximity of the relevant segments to one another in the sequence 310.

According to certain aspects, one of the benefits that may be realized includes the efficiency and low overhead of the above-described video segment importance determinations. Since expensive object-based algorithms need not be used in the above methods, computing environments with comparably less memory and processing power, such as mobile terminals, may be used to implement related methods. For example, the processor 128 of mobile terminal 10 may execute procedures to determine relevant video segments and provide a preview or summary on display 136 of multimedia content stored in memory 134.

While illustrative systems and methods as described herein embodying various aspects of the present invention are shown, it will be understood by those skilled in the art, that the invention is not limited to these embodiments. Modifications may be made by those skilled in the art, particularly in light of the foregoing teachings. For example, each of the elements of the aforementioned embodiments may be utilized alone or in combination or sub-combination with elements of the other embodiments. It will also be appreciated and understood that modifications may be made without departing from the true spirit and scope of the present invention. The description is thus to be regarded as illustrative instead of restrictive on the present invention.

The invention claimed is:

1. A method, comprising:
receiving, at a video frame analyzing device, a segmented video sequence;
identifying a first video frame in said segmented video sequence;
determining an intensity value for the first video frame;
determining a contrast value for the first video frame;
determining that the contrast value is less than a predetermined threshold, and based on said determination lowering the intensity value by a predetermined amount, and
comparing, by the device, the first video frame to a second video frame in the segmented video sequence, said comparison based on the determined intensity value and the determined contrast value.

2. The method of claim 1, further comprising:
determining a motion value for the first video frame, wherein said comparison is further based on the determined motion value.

3. The method of claim 2, wherein said first video frame is identified as a predictive frame (P-frame), and the motion value is determined by comparing the first video frame to a previous video frame in the segmented video sequence.

4. The method of claim 3, wherein determining the motion value comprises identifying a plurality of macroblocks in the first video frame, computing a motion value for each of the plurality of macroblocks, and averaging the plurality of macroblock motion values.

5. The method of claim 4, wherein determining the motion value further comprises, after averaging the plurality of macroblock motion values, lowering the motion value based on determining that the frame is a fast motion frame.

6. The method of claim 2, wherein said first video frame is identified as an intra frame (I-frame), and said motion value is set to zero.

7. The method of claim 1, further comprising:
determining an audio rating associated with said first video frame, wherein said comparison is further based on the audio rating associated with said first video frame.

8. The method of claim 1, wherein determining the intensity value comprises determining a de-quantized discrete cosine transform coefficient for a plurality of macroblocks in the frame.

9. The method of claim 8, wherein the intensity value for the first video frame is computed as the average intensity of each of the plurality of macroblocks.

10. The method of claim 1, wherein determining the contrast value for the first video frame comprises determining a contrast value for a plurality of macroblocks in the frame.

11. A method, comprising:
receiving, at a video frame analyzing device, a segmented video sequence comprising a first video segment, the first video segment comprising a plurality of video frames;
determining one or more of an intensity value, a contrast value, and a motion value for at least one of the first plurality of video frames;
based on the one or more determined intensity value, contrast value, and motion value for the at least one video frame in the first plurality of video frames, determining at least one of an intensity value, a contrast value, and a motion value for the first video segment;
determining a segment relevance rating for the first video segment based on the at least one determined intensity value, contrast value, and motion value for the first video segment;
comparing, at the device, the segment relevance rating for the first video segment to a corresponding segment relevance rating for a second video segment in the segmented video sequence; and
identifying the first video segment as a relevant video segment based on said comparison.

12. The method of claim 11, wherein the first video segment comprises a plurality of P-frames and at least one I-frame, and the method comprises determining an intensity value for the first video segment by computing the maximum intensity value for the at least one I-frame.

13. The method of claim 11, wherein the first video segment comprises a plurality of P-frames and no I-frames, and the method comprises determining an intensity value for the first video segment by computing the maximum intensity value among the plurality of P-frames.

14. The method of claim 11, wherein the segment relevance rating for the first video segment is further based on an audio rating associated with at least one of the first plurality of video frames of the first video segment.

15. The method of claim 11, wherein the segment relevance rating for the first video segment is not based on the length of the first video segment.

16. An apparatus comprising:
a processor controlling at least some operations of the apparatus;
a memory storing computer executable instructions that, when executed by the processor, cause the apparatus to:
receive a segmented video sequence;
identify a first video frame in said segmented video sequence;
determine an intensity value for the first video frame;
determine a contrast value for the first video frame;
determine that the contrast value is less than a predetermined threshold, and based on said determination lower the intensity value by a predetermined amount, and compare the first video frame to a second video frame in the segmented video sequence, said comparison based on the determined intensity value and the determined contrast value.

17. The apparatus of claim 16, the memory storing further computer executable instructions that, when executed by the processor, cause the apparatus to:
determine a motion value for the first video frame, wherein said comparison is further based on the determined motion value.

18. The apparatus of claim 17, wherein said first video frame is identified as a predictive frame (P-frame), and the motion value is determined by comparing the first video frame to a previous video frame in the segmented video sequence.

19. The apparatus of claim 17, wherein determining the motion value comprises identifying a plurality of macroblocks in the first video frame, computing a motion value for each of the plurality of macroblocks, and averaging the plurality of macroblock motion values.

20. The apparatus of claim 16, the memory storing further computer executable instructions that, when executed by the processor, cause the apparatus to:
determine an audio rating associated with said first video frame, wherein said comparison is further based on the audio rating associated with said first video frame.

* * * * *